US 6,449,356 B1

(12) United States Patent
Dezonno

(10) Patent No.: US 6,449,356 B1
(45) Date of Patent: Sep. 10, 2002

(54) METHOD OF MULTI-MEDIA TRANSACTION PROCESSING

(75) Inventor: Anthony J. Dezonno, Chicago, IL (US)

(73) Assignee: Rockwell Semiconductor Systems, Inc., Newport Beach, CA (US)

(*) Notice: Subject to any disclaimer, the term of this patent is extended or adjusted under 35 U.S.C. 154(b) by 0 days.

(21) Appl. No.: 09/084,815

(22) Filed: May 26, 1998

(51) Int. Cl.[7] .................................................. H04M 3/00
(52) U.S. Cl. ........................... 379/265.01; 379/265.13; 379/265.09; 379/265.02
(58) Field of Search .............................. 379/265, 266, 379/88.13, 34, 93.17, 201, 203, 210, 267, 93.25, 212, 88.17, 88.19, 88.2, 269, 308, 309, 265.01, 265.02, 265.03, 265.05, 265.09, 265.11, 265.12, 265.13, 266.02

(56) References Cited

U.S. PATENT DOCUMENTS

| 4,289,934 A | 9/1981 | Pitroda et al. ............... 379/269 |
| 4,979,171 A | 12/1990 | Ashley ......................... 370/525 |
| 5,127,004 A | 6/1992 | Lenihan et al. ............... 370/525 |
| 5,268,903 A | 12/1993 | Jones et al. .................. 370/384 |
| 5,335,269 A | 8/1994 | Steinlicht .................... 379/266 |
| 5,365,581 A | 11/1994 | Baker et al. ................. 379/196 |
| 5,384,841 A | 1/1995 | Adams et al. ............... 379/266 |
| 5,469,504 A | 11/1995 | Blaha .......................... 379/265 |
| 5,500,891 A | 3/1996 | Harrington et al. ......... 379/265 |
| 5,544,232 A | 8/1996 | Baker et al. ............... 379/88.25 |
| 5,546,456 A | 8/1996 | Vilsoet et al. ............... 379/265 |
| 5,619,725 A | * 4/1997 | Gordon ........................ 710/19 |
| 5,884,032 A | * 3/1999 | Bateman et al. ............ 709/204 |
| 5,982,873 A | * 11/1999 | Flockhart et al. ........... 379/266 |
| 6,021,428 A | * 2/2000 | Miloslavsky ................ 709/206 |
| 6,038,308 A | * 3/2000 | Anthos et al. ............... 379/219 |
| 6,046,762 A | * 4/2000 | Sonesh et al. ............... 348/16 |
| 6,058,163 A | * 5/2000 | Pattison et al. ............. 379/34 |
| 6,058,435 A | * 5/2000 | Sassin et al. ................ 709/331 |
| 6,111,947 A | * 8/2000 | Galgano, Jr. et al. ....... 379/269 |
| 6,122,364 A | * 9/2000 | Petrunka et al. ............ 379/265 |
| 6,181,366 B1 | * 1/2001 | Dezonno et al. ............ 379/265 |

* cited by examiner

Primary Examiner—Fan Tsang
Assistant Examiner—Ovidio Escalante
(74) Attorney, Agent, or Firm—Welsh & Katz, Ltd.

(57) ABSTRACT

A method and apparatus are provided for processing multi-media telecommunication transactions by a call processing center. The method includes the steps of detecting a call of the multi-media telecommunication transactions by a host computer of the call processing center and transferring a transaction request from the host to a call processor for assignment of an agent to the call. The method further includes the steps of transferring an identifier of the assigned agent from the call processor to the host and transferring the call received from the host to the assigned agent.

51 Claims, 2 Drawing Sheets

METHOD OF MULTI-MEDIA TRANSACTION PROCESSING

FIELD OF THE INVENTION

The field of the invention relates to automatic call distributors and more particularly to automatic call distributors capable of processing transactions under voice and non-voice formats.

BACKGROUND OF THE INVENTION

Automatic call distribution system s are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the automatic call distributor (ACD) may distribute the calls based upon which agent position (telephone) has been idle the longest.

In order to distribute incoming calls from the PSTN to the available agents, the interaction of a controlling computer with a switching fabric of the ACD becomes essential. Often a connection of the ACD to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue of the selected agent (or group of agents) or directly to the selected agent. At the same time that the call is delivered to the agent, the controller sends an identifier of the selected agent and ANI number of the customer to a controller of the database (the host). The host, in turn, displays the customer records on a computer monitor of the terminal of the selected agent at the same time the call is delivered.

While the existing method of ACD operation is relatively satisfactory, it is not readily adapted to inquires from customers arriving by fax or via the Internet. Accordingly, a need exists for a means of adapting ACD operation to a mult-imedia environment which includes voice, data, the Internet or some combination thereof.

SUMMARY

A method and apparatus are provided for processing multi-media telecommunication transactions by a call processing center. The method includes the steps of detecting a call of the multi-media telecommunication transactions by a host computer of the call processing center and transferring a transaction request from the host to a call processor for assignment of an agent to the call. The method further includes the steps of transferring an identifier of the assigned agent from the call processor to the host and transferring the call received from the host to the assigned agent.

DETAILED DESCRIPTION OF AN EMBODIMENT

Figure 1:
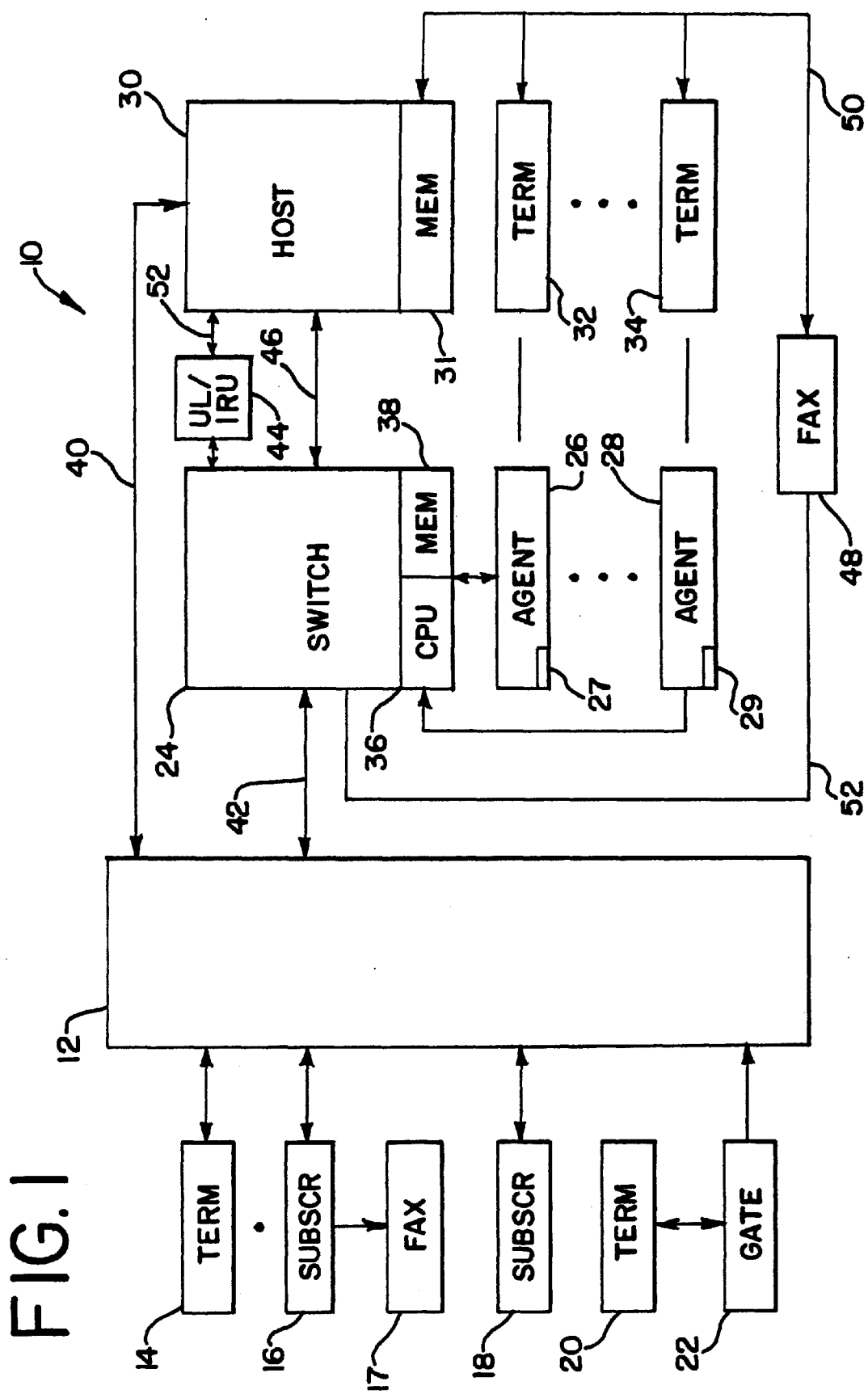
FIG. 1 is a block diagram of a telecommunications system, including an automatic call distributor in accordance with an embodiment of the invention.

FIG. 1 is a block diagram of an exemplary embodiment of an automatic call distribution ACD system 10 in accordance with the invention. Under the embodiment, the ACD 10 may process customer inquiries (transactions) through any of a number of communication media. For purposes of the invention, an inquiry may be a call received under either a voice or data format. As used herein, a call is not limited to two people conversing over a telephone, but may more accurately be described as including, but not limited to, conventional voice connections, facsimile transmissions, E-mail messages or Internet transmissions.

Calls from customers may be initiated from subscriber telephones 16, 18, or a facsimile machine 17 attached to a telephone 16, 18. A customer call may also be delivered by E-mail or through the Internet from a customer computer terminal 14 attached to the PSTN through an appropriate interconnect (e.g., an ISDN interconnect, an Internet gateway 22 such as AOL, etc.).

Calls from customers may be handled by agents associated with the ACD 10. An agent may service calls through an agent station 26, 28 (e.g., a telephone) and associated agent terminal 32, 34. Calls under a voice format may be delivered to an agent station 26, 28 along with a screen pop on the agent terminal 32, 34 of associated customer data. The customer data may be identified by the host based upon ANI information delivered from the PSTN 12 to the switch 24 and transferred to the host in a known manner. Calls delivered under a data format (e.g., fax, E-mail, Internet, etc.) may be delivered by the host 30 as a visual message displayed on a screen of a terminal 32, 34 of the agent assigned to the call.

To facilitate delivery of calls, an owner of the ACD 10 may disseminate, by advertising or otherwise, a call address for delivery of calls. (As used herein, a call may be any message delivered under either a voice or data format.) In the case of calls under a voice format, or facsimile transmissions, the address may simply be a telephone number. In the case of E-mail, the address may simply be an E-mail address. In the case of the Internet, the address may be an address of a website.

Under the embodiment, calls delivered from the PSTN 12 to the ACD 10 under voice format may be handled conventionally. The ACD 10 may include a switch 24 which may be interconnected with the PSTN 12 through a number of trunk lines 42. The PSTN 12 may offer service on the trunk lines 42 in association with services such as ANI or DNIS. Call control, call maintenance, and call set-up may be accomplished over the trunk line itself or over an associated control channel.

DNIS information supplied by the PSTN 12 is useful where inbound calls to the ACD 10 may be directed to any of a large block of telephone numbers assigned to ACD 10. Calls of the block of numbers may be delivered to the ACD 10 through the trunk lines 42 in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1. DNIS information in such cases may also be used to help deliver a call to a proper agent or group of agents.

The switch 24 may be controlled by a central processing unit, or CPU 36, in conjunction with peripheral memory device 38. Control of the switch 24 and communications with the host 30 and PSTN 12 may be accomplished generally as described in U.S. Pat. Nos. 5,268,903, and 5,140,611, both to Jones, and both incorporated herein by reference. Routing of calls to agents 26, 28 and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPU 36 monitors each port of the switch 24 for changes in status. A change in status may be an agent unit 26, 28 going off-hook to make a call, an agent unit hanging up after a call, or it may be a call alerting tone detected on a trunk alerting the CPU 36 to the presence of an incoming call.

Where the status change is an agent 26, 28 hanging up, the CPU 36 acts to tear-down the call connection within the switch 24 between the agent at a first port of the switch and a second party to the conversation communicating through a second port of the switch 24. Upon tear down of the connection, the CPU 36 also sends a message to the host, notifying the host of termination of the call connection. The message to the host 30 includes at least the identity of the agent 26, 28.

Where the status change is a call alert signal on an incoming trunk line (or control channel associated with the incoming trunk line), then the CPU 36 may send an acknowledge message to the PSTN 12 accepting the call. The PSTN 12 may respond by forwarding DNIS and ANI messages, identifying the called and calling party.

Upon accepting the call, the CPU 36 first stores the DNIS and ANI numbers in a termination table of the memory 38. More specifically, the CPU 36 maintains a table of call information for each port of the switch 24. Where a call is accepted on an incoming trunk line, the CPU 36 enters the DNIS and ANI number into the table for the incoming trunk line upon which the call is received.

Figure 3:
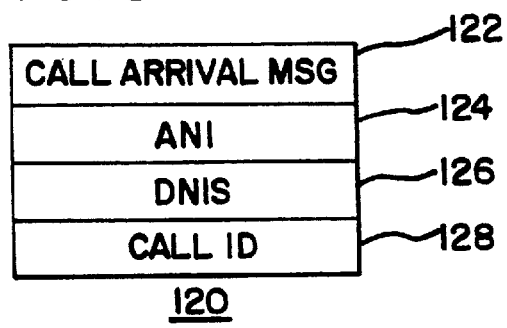
FIG. 3 depicts a call arrival message that may be used by the automatic call distributor of FIG. 1.

In addition to updating the termination table within memory 38, the CPU 36 also generates a call identifier (also sometimes referred to as a call ID or sequence number) for the call, unique to the switch 24. The call identifier along with the ANI and DNIS numbers may then be sent to the host 30 as part of a call arrival message 120 (FIG. 3). The call arrival message 120 includes a header 122 identifying the message 120 as being a call arrival message. The message 120 may also include an ANI number 124, DNIS information 126 and the call identifier 128.

Delivery of the ANI 124 and DNIS 126 numbers and call identifier 128 allows the host 30 to create a unique call record for the call in a call record area of memory 31. The call record (and specifically the ANI information within the call record) may be used to retrieve customer records for delivery to an appropriate display terminal 32, 34 once the call has been assigned to an agent 26, 28.

The CPU 36 then, by reference to the DNIS number, determines the identity of an agent (or group of agents) 26, 28 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 26, 28 (or group of agents) the CPU 36 instructs the switch 24 to internally connect the port of the incoming trunk to a port of one of the identified agents.

Where the call has been connected to an agent, the CPU 36 stores the port number of the identified agent in the termination table for the port of the incoming trunk. Likewise, the CPU 36 stores the port identifier of the incoming trunk in the termination table of the identified agent.

Figure 4:
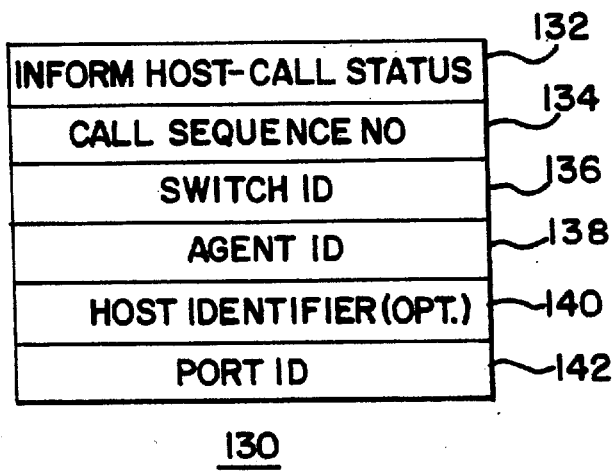
FIG. 4 depicts an inform host—call status message that may be used by the automatic call distributor of FIG. 1.

To complete set-up of the call to the identified agent, the CPU 36 sends a call completion message (e.g., an INFORM HOST-CALL STATUS message 130) 130 (FIG. 4) to the host 30. The call completion message 130 may include a header 132 identifying the message as being a call completion message 130. The call completion message 130 may also include at least a port identifier 138 of the identified agent and the call identifier 134. The information of the call completion message is stored in the call record previously created in conjunction with arrival of the call arrival message. The port identifier 138 and call identifier 134 allows the host 30 to deliver customer data to the specific display terminal 32, 34 of the agent to which the call was delivered.

Where the call is a facsimile transmission, a specific inbound telephone number may be used for delivery of the facsimile transmission to the ACD 10. Upon detection of the call, the CPU 36 may send a call arrival message 120 to the host 30 resulting in the creation of a call record. The CPU 36 may detect the call as being a facsimile transmission based upon the DNIS number of the call. Upon detection of such a call, the CPU 36 of the switch 24 may internally capture the facsimile transmission as a data file and transfers the file to the host 30, or route the transmission to an external facsimile storage device 48 as shown in FIG. 1.

The external facsimile storage device 48 functions to temporarily store facsimile messages pending delivery of the message to an agent through an agent terminal 32, 34. The host 30 may control the facsimile storage device 48 through a local area network (LAN) 50.

In order to route the call, the CPU 36 may enter a look-up table using a DNIS number of the call as a means of identifying the switch port of the facsimile storage device 48. Upon identifying a switch port of the facsimile device 48, the CPU 36 instructs the switch 24 to complete the connection between the caller and facsimile storage device 48.

Upon completing call delivery, the CPU 36 may also send a call completion message 130 to the host 30, informing the host of delivery of the call to the facsimile storage device 48. Upon receipt of the call completion message 130, the host 30 may instruct the facsimile storage device 48 via the LAN 50 to create a file under an appropriate file identifier and to begin receiving facsimile information. In turn the storage device 48 may open a file, generate a carrier tone and begin storing the facsimile message.

The host 30 may use any convenient identifier for the file. For example, the call identifier 134 originally assigned by the switch 24, ANI information from the original call arrival message 120, or any some other identifier from the originally created call record may be used.

As an alternative, calls to a facsimile number of the ACD 10 may be routed directly to the external facsimile storage device 48 through an optional external connection 56. Where facsimile calls are routed through the external connection 56, a controller 58 of the storage device 48 notifies the host 30 of call arrival. Upon detection of call arrival, the host 30 generates a host identifier and associated call record.

To deliver the facsimile transmission to an agent, the host 30 must first obtain an identity of an agent to handle the call. To ensure efficient handling of the call, the identified agent should also not be disturbed during processing of the facsimile message.

To achieve both objectives, the host 30 may transfer a make call message 100 (FIG. 2) to the switch 24. The make call message 100 may be used as a means of stimulating the switch 24 to assign an agent and ensures that the assigned agent will not be disturbed while the facsimile message is being handled.

Figure 2:
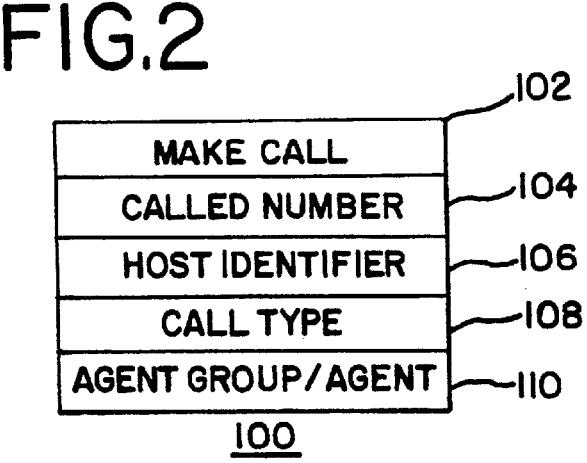
FIG. 2 depicts a make call message that may be used by the automatic call distributor of FIG. 1.

FIG. 2 is a block diagram of the format of the make call message 100. The make call message 100 includes a message header 102 which identifies the message 100 as being a make call message. The message 100 may also include a called number 104, a host identifier 106 and a call type message 108.

The host identifier 106 may simply be a number created by the host 30 for purposes of tracking the call. The call number 104, on the other hand, may be any number appropriate for purposes of processing a fax transmission.

For example, the call number 100 may be directed to an unused extension of the switch 24 or to a dummy load 44 connected to a port of the switch. One criteria that may be considered in selecting the call number for processing a facsimile transmission is that the called number in some ACDs must be answered in order for the ACD to assign an agent.

Connecting a call to a dummy load allows a call placed to that number to be answered by the dummy load and fools the CPU 36 of the switch 24 into thinking that a call has been completed in a normal manner through that port and stimulates the CPU 36 to select an agent for handling that call. Connecting a selected agent telephone to a dummy load also ties up the agent's phone and prevents other calls from being delivered while the agent is handling a facsimile transmission.

Alternately, the load 44 connected to an agent's telephone during facsimile delivery may be a voice response unit (VRU) 44 which announces the format of the call. For example, for a facsimile transmission, a VRU 44 may deliver the words "please refer to terminal screen for facsimile message".

As a further alternative, the dummy load may simply be a conceptual call destination in software of the CPU 36. In fact, the objectives of agent identification and dedication of an agent to processing of a delivered facsimile may be accomplished by specifying a port number of an application within the switch 24 dedicated to handling such requests.

Turning now to the make call message 100, an explanation will now be provided as to the processing of the make call message 100 within the CPU 36. In general, the message type 108 of a make call message 100 provides a tracking classification to the CPU 36 for purposes of tracking agent activity during a predetermined time period (e.g., a work shift, per month, etc.). For purposes of a voice transaction (i.e., predictive outdialing), the call type 108 may be "00". Where the call relates to a received fax transmission the call type may be arbitrarily assigned the number "01". For an E-mail transaction, the call type 108 may be "02", a web page transaction may be "03", voice mail processing may be "04", a video transaction may be "05", a data transaction may be "06", a web telephony transaction may be "07", while message types "08" to "255" may be user definable.

Upon receipt of the make call message 100, the CPU 36 of the switch 24 first selects an agent to handle the call. The CPU 36 may use any criteria for assigning an agent. The CPU 36 may select the agent that has been idle the longest, or the CPU 36 may place the call request in a call queue for service by the next available agent.

Alternatively, the make call message 100 may be routed to a special purpose call processing application (not shown) in the CPU 36 dedicated for handling such calls. The call processing application may select an agent based upon such criteria as proficiency in handling fax messages, loading of the ACD 10, identity of the fax sender, time of day, or some other agent criteria.

Upon identification of an agent (either through identification of an idle agent or because the call has reached a head of the call queue), the CPU 36 sends a call status message 130 to the host 30 identifying the selected agent and takes steps to connect the selected agent to the call target. In addition to an identity of a port 138 of a selected agent, the call status message 130 also returns the host identifier 140 sent to the CPU 36 as part of the original make call message 100.

Through the host identifier 140, the host 30 is able to identify the call record originally created relative to this call. By reference to the call record, the host 30 is able to identify the record identifier of the facsimile transmission stored in the facsimile storage device 48.

Upon receiving the call status message 130, the host 30, by reference to an agent look-up table determines the terminal 32, 34 of the selected agent based upon the agent identifier 138 in the call status message 130. Upon identifying the terminal 32, 34, the host 30 sends a message, via the LAN 50, to the facsimile storage device 48, requesting that the facsimile storage device 48 forward the file containing the facsimile transmission to the identified terminal 32, 34.

Also, from the call status message 130, the host 30 is informed of the port within the VRU 44 to which the selected agent has been connected. With the knowledge of the port of the VRU 44, the host 30 may program the VRU 44 to send an appropriate message to the selected agent. Where the VRU 44 is incorporated into the host 30, the host may simply activate the appropriate application to present the appropriate message to the selected agent.

Concurrent with delivery of the call status message 130 to the host 30 and delivery of the facsimile message to the terminal 32, 34 of the selected agent, the telephone 26, 28 of the selected agent may alert the agent to the incoming call. The agent may answer the telephone 26, 28 and hear the verbal announcement of the call type at same time as the facsimile is displayed on the screen of the agent's terminal 32, 34.

Alternatively, delivery of the call to the terminal 32, 34 of the selected agent may be delayed until the selected agent acknowledges the call request (e.g., by picking up a handset or selecting a call accept button on the agent station 26, 28). Delaying delivery of the call until the agent is ready to accept the call (and acknowledges a willingness to accept the call) may be used to avoid the possibility of delivering a call to a vacant agent station.

Once the call is delivered to the selected agent, the CPU 36 of the switch 24 maintains the selected agent on a busy list until the selected agent activates a release key 27, 29 on the agent station 26, 28. Maintaining the agent on a busy list until activation of the release key 27, 29 allows the selected agent to hang up from the initial call notification and make other calls as a part of the same transaction. This feature may be important where, for instance, the delivered facsimile message requests a call-back to the caller (facsimile sender) or the facsimile message is incomplete and a call needs to be placed to the sender to obtain such missing information.

Further, since the call record associated with facsimile delivery may also contains ANI information, that information is easily retrieved for display to the agent. For example, should the agent wish to call the facsimile sender, the agent may simply activate the appropriate key on his terminal 32, 34 to display customer information of the sender (which would typically include ANI information). A call-back to the facsimile sender may, in fact, be automated by simply an appropriate soft-key which loads the customer telephone number into an outdialing modem from the customer records.

At the conclusion of the transaction, the agent activates the release key 27, 29 on the agent station. Upon activation of the release key 27, 29, the CPU 36 returns the agent to the list of available agents.

In the case where the incoming call is an E-mail message, a similar process may be used. Upon receipt of an E-mail message, the host 30 takes steps to open an inquiry file for the E-mail message, including an associated call record within memory 31. The host 30 also generates and stores a host identifier in the call record along with the E-mail message.

Upon completion of the E-mail file and call record, the host 30 transfers a make call request 100 to the switch 24, including the host identifier 106 assigned by the host 30 to the call. Again, the called number 104 may be the dummy line or VRU 44. The call type 108 may be given a value of "02" to identify the call to the CPU 36 as being an E-mail transmission. The host 30 may also send a programming message over a link 52 to the VRU 44 selecting an appropriate message notifying the selected agent of the delivery of an E-mail message. In this case, the message presented to the selected agent may be "please see terminal for E-mail message". Alternatively, the message may instruct the selected agent to press "ENTER" on a keyboard of his terminal 32, 34 or select an appropriate E-mail application to accept delivery of the call.

As with ANI, an E-mail address of the E-mail sender is typically delivered with delivered E-mail messages. The E-mail address of the sender may be used in a similar manner to ANI information to allow the host to identify and display customer records to a selected agent.

Where the E-mail message contains a telephone number of the E-mail sender, the agent may enter that number through his telephone 26, 28 to return the call. Alternatively, the agent may return an E-mail massage to the caller as an appropriate response.

As with previous examples, once the selected agent has accepted the call, the CPU 36 of the switch 24 lists the selected agent as busy. Again, the selected agent is returned to an available status by pressing a release key 27, 29 on the agent station at the end of the transaction.

Upon acceptance of the call, the CPU 36 tracks the time spend on responding to the message. Since the call type had a value of "02", the time would be charged to E-mail transactions.

In the case of calls through the Internet and web page transactions processed through the Internet, a related process may be used. The host 30 may maintain a web site through an external connection 40 with the PSTN 12. A customer may access the web site through a terminal 14, 20 connected to the Internet through the PSTN 12. As a part of the web site facilities provided by the host 30, specific pages of the web site may provide interactive services where a visitor to the web site may enter a call-back number or request direct connection to an agent using web telephony.

In either case, the host 30 upon detecting access to the website may function to open an inquiry file for the request, which may include a call record and specific inquires. The inquiry file may contain basic Internet information (i.e., an Internet address of the caller) and a call record. The information may be used to generate and enhance a customer base and provide sales leads for futures sales campaigns.

Where the caller makes a specific request through the web site, the request may form the basis of a call which may be delivered to an agent. For example upon accessing the web site, the caller may be presented with a web page which presents the caller with a data entry field where the caller may enter certain questions (i.e., "what is the price of x", "what is the delivery time of y", "will your product x work with my z", etc.).

The caller may be presented with a number of options for receiving responses to his inquires. First, a field may be provided where the caller may enter his telephone number. Second, the caller may request an immediate web telephony connection with an agent. Finally, if the caller doesn't select either of these two options, then it would be assumed that the caller desires a response through his Internet address.

If the caller leaves a telephone number through the web site, the host 30 would enter the telephone number as a called number during call delivery to the agent. On the other hand, where the call requests a connection with an agent using web telephony or leaves an inquiry which may be answered via the Internet, then the host 30 would act to recover an Internet address of the caller and enter the Internet address from the inquiry file as part of the information delivered to the terminal 32, 34 of the agent during call delivery.

Where the call is an Internet inquiry leaving an telephone number, the host 30 composes a make call message 100 to the CPU 36 of the switch 24. The called number 104 is the telephone number of the source of the inquiry 16, 18. The call type 108 may be "00" to indicate that this is an outbound call under a voice format to a PSTN subscriber. Alternatively, the call type 108 could be "11" to indicate that this is an outbound call under a voice format to a PSTN subscriber in response to an Internet inquiry. Further because of the range of call types available, the call type could be used by the host 36 as an indication to the CPU 36 of the qualifications of the type of agent to be selected to respond to the call.

Upon receiving the make call message 100, the CPU 36 places the call in a queue. When an agent becomes available, the CPU 36 takes steps to complete the connection to the selected agent. By reference to a look-up table, the CPU 36 determines that the called number 104 is a call through the PSTN 12. In response, the CPU 36 may seize an appropriate trunk line and outpulse the called number 104 to the PSTN 12. Upon detecting an answer, the CPU 36 instructs the switch 24 to connect the trunk to the selected agent. The CPU 36 also sends a call status message 130 to the host 30.

By matching the host identifier 106 of the call status message 130, the host is able to identify the inquiry file created in response to the Internet call transaction. From the agent identifier 138 of the status message 130, the host 30 is able to generate and send to the terminal of the selected agent a summary of the Internet call transaction. The summary may include the caller's Internet address as well as an indicator of the web page from which the call-back was requested and specific inquiry. The indicator of the web-page where the call-back was requested may be important to the agent in understanding the context of the inquiry. For instance, where the owner of the ACD 10 is a manufacturer and the website has many web pages describing many different products, the web-page where the inquiry originated suggests the subject matter of the inquiry. Further, the web-page of the inquiry may also be used by the host 30 is routing the call-back request to the correct agent or group of agents by specifying a particular agent group 110 in the make call request.

In another example, the Internet call transaction may request a web telephony return call. For a web telephony return call, the host 30 may compose and transfer a make call message 100 to the switch 24 requesting an identity of an agent to make the call. Since the call would be executed through the Internet the called number 104 would be to the DL or VRU 44. The call type may be "07".

In response to the make call request, the CPU 36 may select an agent and alert the agent to the incoming call. The CPU 36 may also send a call status message 130 to the host 30 notifying the host of the identity of the selected agent.

In response to the call status message 130, the host 30 would identify the terminal of the selected agent 32, 34 and take steps to set up a web telephony connection between the selected agent and originator of the inquiry through the terminal 32, 34 of the agent. Where the terminal 32, 34 has a separate web phone application operating on the terminal 32, 34, the host 30 would simply send the Internet address of the originator of the inquiry and an appropriate instruction to the terminal 32, 34 activating the web phone application. Where Internet transactions are centralized, the host 30 would activate its own Internet web phone application and establish a two-way internal path (e.g., via a LAN connection) to route voice to a voice plug within the terminal of the selected agent and data with a respective data plug within the terminal of the selected agent (and visa versa, in the other direction to the caller).

In another example, an agent (or agent's supervisor) may wish to have the CPU 36 of the switch 24 do timekeeping for the agent. In this case the agent (or supervisor) may designate user definable call type "08" as a means of tracking the time an agent spends on breaks. To activate this feature, the agent may simply pull down a menu on his terminal devoted to time tracking and select an item labeled "BREAK" to request permission to take a break.

In response the host 30 may create an inquiry file and call record as above, but with very limited entries. The call type (e.g., "08") may be entered along with a host identifier. The requesting agent identifier would also be included.

The host may also send a make call request 100 to the CPU 36 reflecting such request. The called number 104 would be to the dummy line or VRU 44. The call type 108 would be "08". Instead of an agent group identifier, a particular agent identifier may be entered in the agent group 110.

In response, CPU 36 would enter the call request in a queue for the particular agent. When the call request reaches the head of the queue (either immediately or when the queue for the group is reduced to zero depending upon supervisory programming preferences) a call alert may be delivered to the requesting agent.

As the call alert is sent to the requesting agent a call status message 130 is sent to the host 30. The call status message 130, in addition to other information, may include an identifier 142 of the port selected for connection to the DL/VRU 44. The host 30 may use the port identifier 142 to cause the VRU 44 connected to the selected port to present a message to the agent such as "you may now begin your break. Please return no later than ____". Alternatively, when the requesting agent accepts the call, a similar message may be presented by the host 30 on the terminal of the requesting agent.

When the requesting agent returns from his break, the agent activates the release key 27, 29. Activating the release key 27, 29 returns the agent to the list of available agents. Upon returning the agent to the list of available agents, the CPU 36 also makes a time entry in a table in memory 38 for the agent as to the time spent for the call type.

Periodically, the CPU 36 may accumulate a total time spent on each call type for purposes of agent/group performance. Total time spent on breaks or personal matters may be provided for each agent based upon assigned call type.

A breakdown of agent performance by group may also be provided. The breakdown may be provided per reporting period based upon time spent on voice calls (call type "00"), or fax calls (call type "01"), or E-mail calls (call type "02"), etc.

Under another embodiment of the invention, call delivery is scheduled based upon resources and estimated time in queue. For instance, some calls (e.g., from a facsimile machine, another computer through a modem, video transmission over an ISDN connection, etc.) must be handled immediately after answering or the call will be terminated by the caller. Answering of calls of these types may be deferred until resources are available. In other cases, delivery of calls from important customers may be expedited based upon the identify of the customer.

In the case of a calling fax machine, a carrier signal must be presented to a caller very quickly after call delivery or the caller (i.e., the calling facsimile machine or computer) will hang up. Where a call is answered and placed in a call queue, the absence of a carrier signal results in a call disconnect from the caller. This is wasteful of call resources. Further, where the call resources (i.e., incoming call trunk lines) involve the use of 800 numbers, the presence of a call in a call queue may result in increased expense for the operator of the system 10.

In order to expedite the handling of calls, call answering by the switch 24 is scheduled based upon the identity of the caller or destination of the call. In the case where a special telephone number is provided for fax or data transmission, the destination of the call is determined by DNIS numbers. Calls directed to number designated for fax or data are programmed to allow very limited or no time in queue. Calls of this type to these predetermined telephone numbers are not answered until a resource is available to directly handle the call.

Under the embodiment, call delivery may also be scheduled based upon importance of the call. Important customers may be given the highest priority. Voice calls may be given a second priority. Fax or data transmissions may be given a lowest priority.

A specific embodiment of a method and apparatus of processing multi-media calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of processing multi-media telecommunication transactions by a call processing center, such method comprising the steps of:

detecting a call of the multi-media telecommunication transactions by a host computer of the call processing center;

determining a type of the detected call and assigning a tracking classification based upon the determined call type;

transferring a transaction request including the tracking classification from the host to a call processor for assignment of an agent to the call based, in part, upon the tracking classification;

transferring an identifier of the assigned agent from the call processor to the host; and transferring the call to the assigned agent.

2. The method of processing multi-media telecommunications transactions as in claim 1 further comprising receiving and switching calls of the multi-media transactions received under a voice format by the call processor to respective agents of the plurality of agents.

3. The method of processing multi-media transactions as in claim 2 wherein the step of processing multi-media transactions further comprises receiving identifying information of a source of the multi-media transaction from a telecommunication network.

4. The method of processing multi-media transactions as in claim 3 wherein the step of receiving identifying information of the source of the multi-media transaction further comprises transferring the received identifying information of each caller from the call processor to the host.

5. The method of processing multi-media transactions as in claim 4 wherein the step of transferring the received identifying information of each caller from the call processor to the host further comprises searching a database of the host and transferring customer information identified by the identifying information to a terminal of the respective agent.

6. The method of processing multi-media telecommunication transactions as in claim 1 further comprising tracking call-related and non-call related activity of the assigned agent within the call processor based upon the tracking classification of the call type.

7. The method of processing multi-media transactions as in claim 6 further comprising delaying call delivery based upon call type.

8. The method of processing multi-media transactions as in claim 1 wherein the step of detecting receipt of a call of the multi-media transactions by the host further comprises sensing the call as being a facsimile transmission and storing a content of the facsimile transmission as a call received under a data format in a database of the host.

9. The method of processing multi-media transactions as in claim 1 wherein the step of detecting receipt of a call by the host of the call processing center further comprises sensing an Internet transmission from a connected telecommunication network and storing a content of the Internet transmission as a call received under a data format in a database of the host.

10. The method of processing multi-media transactions as in claim 1 wherein the step of transferring a transaction request from the host to the call processor for assignment of an agent to the call further comprises requesting an outbound call to a call processing application.

11. The method of processing multi-media transactions as in claim 10 wherein the step of requesting an outbound call to a call processing application further comprises simulating completion of the outbound call to the non-existent number.

12. The method of processing multi-media transactions as in claim 11 wherein the step of simulating completion of the outbound call to the call processing application further comprises transferring a call status message to the host including the identity of the assigned agent and requested outbound call.

13. The method of processing multi-media transactions as in claim 12 wherein the step of transferring a call status message to the host further comprises retrieving a terminal identifier of the assigned agent.

14. The method of processing multi-media transactions as in claim 13 wherein the step of transferring the call received under the data format from the host to the assigned agent further comprises transferring a summary of the call from the host to the identified terminal of the assigned agent.

15. The method of processing multi-media transactions as in claim 1 further comprising maintaining a queue of calls by the call processor for the multi-media transactions received under voice and data format for the plurality of agents.

16. The method of processing multi-media transactions as in claim 15 wherein the step of maintaining a queue of calls further comprises assigning a call of the queued calls to a first available agent of the plurality of agents.

17. The method of processing multi-media transactions as in claim 16 further comprising delaying transmission of the identifier of an assigned agent to the host until the transferred transaction request from the host to the call processor reaches a front of the queue.

18. Apparatus for processing multi-media telecommunication transactions by a call processing center, such apparatus comprising:

means for detecting a call of the multi-media telecommunication transactions by a host computer of the call processing center;

means for determining a type of the detected call and assigning a tracking classification based upon the determined call type;

means for transferring a transaction request including the tracking classification from the host to the call processor for assignment of an agent to the call received under the data format based, in part, upon the tracking classification;

means for transferring an identifier of the assigned agent to the host; and means for transferring the call to the assigned agent.

19. The apparatus for processing multi-media telecommunications transactions as in claim 18 further comprising means for receiving and switching calls of the multi-media transactions received under a voice format by the call processor to respective agents of the plurality of agents.

20. The apparatus for processing multi-media transactions as in claim 19 wherein the means for processing multi-media transactions further comprises means for receiving identifying information of a source of the multi-media transaction from a telecommunication network.

21. The apparatus for processing multi-media transactions as in claim 20 wherein the means for receiving identifying information of the source of the multi-media transaction further comprises means for transferring the received identifying information of each caller from the call processor to the host.

22. The apparatus for processing multi-media transactions as in claim 21 wherein the means for transferring the received identifying information of each caller from the call processor to the host further comprises means for searching a database of the host and transferring customer information identified by the identifying information to a terminal of the respective agent.

23. The apparatus for processing multi-media transactions as in claim 18 further comprising means for tracking call-related and non-call-related agent activity within the call processor based upon the tracking classification of the call type.

24. The apparatus for processing multi-media transactions as in claim 18 further comprising means for delaying call delivery based upon call type.

25. The apparatus for processing multi-media transactions as in claim 18 wherein the means for detecting receipt of a call of the multi-media transactions under by the host further comprises means for sensing the call as being a facsimile transmission and storing a content of the facsimile transmission as a call received under a data format in a database of the host.

26. The apparatus for processing multi-media transactions as in claim 18 wherein the means for detecting receipt of a call by the host of the call processing center further comprises means for sensing an Internet transmission from a connected telecommunication network and storing a content of the Internet transmission as a call received under a data format in a database of the host.

27. The apparatus for processing multi-media transactions as in claim 18 wherein the means for transferring a transaction request from the host to the call processor for assignment of an agent to the call further comprises means for requesting an outbound call to a call processing application.

28. The apparatus for processing multi-media transactions as in claim 27 wherein the means for requesting an outbound call to call processing application further comprises means for simulating completion of the outbound call to the call processing application.

29. The apparatus for processing multi-media transactions as in claim 28 wherein the means for simulating completion of the outbound call to the call processing application further comprises means for transferring a call status message to the host including the identity of the assigned agent and requested outbound call.

30. The apparatus for processing multi-media transactions as in claim 29 wherein the means for transferring a call status message to the host further comprises means for retrieving a terminal identifier of the assigned agent.

31. The apparatus for processing multi-media transactions as in claim 30 wherein the means for transferring the call received under the data format from the host to the assigned agent further comprises means for transferring a summary of the call from the host to the identified terminal of the assigned agent.

32. The apparatus for processing multi-media transactions as in claim 18 further comprising means for maintaining a queue of calls by the call processor for the multi-media transactions received under voice and data format for the plurality of agents.

33. The apparatus for processing multi-media transactions as in claim 32 wherein the means for maintaining a queue of calls further comprises means for assigning a call of the queued calls to a first available agent of the plurality of agents.

34. The apparatus for processing multi-media transactions as in claim 33 further comprising means for delaying transmission of the identifier of an assigned agent to the host until the transferred transaction request from the host to the call processor reaches a front of the queue.

35. Apparatus for processing multi-media telecommunication transactions by a call processing center, such apparatus comprising:

a call detector which detects a call of the multi-media telecommunication transactions by a host computer of the call processing center;

the host processor that determines a type of the detected call and assigns a tracking classification to the call based upon the determined call type;

a service processor which transfers a transaction request including the tracking classification of the determined call type from the host to the call processor for assignment of an agent to the call based, in part, upon the tracking classification;

an agent processor which transfers an identifier of the assigned agent to the host; and a delivery processor which transfers the call to the assigned agent.

36. The apparatus for processing multi-media telecommunications transactions as in claim 35 further comprising a call processor of the call processing center which processes and assigns calls of the multi-media transactions received under a voice format to respective agents of the plurality of agents.

37. The apparatus for processing multi-media transactions as in claim 36 wherein the call processor and call detector which process multi-media transactions further each comprise a network buffer which receives identifying information of a source of the multi-media transaction from a telecommunication network.

38. The apparatus for processing multi-media transactions as in claim 37 wherein the network buffer of the call processor which receives identifying information of the source of the multi-media transaction further comprises a transfer processor which transfers the received identifying information of each caller from the call processor to the host.

39. The apparatus for processing multi-media transactions as in claim 38 wherein the transfer processor which transfers the received identifying information of each caller from the call processor to the host further comprises a search processor which searches a database of the host and transfers customer information identified by the identifying information to a terminal of the respective agent.

40. The apparatus for processing multi-media telecommunication transactions as in claim 35 further comprises a tracking processor which tracks call-related and non-call-related activity of the assigned agent based upon the tracking classification of the call type.

41. The apparatus for processing multi-media transactions as in claim 40 further comprising a delay controller which delays call delivery based upon call type.

42. The apparatus for processing multi-media transactions as in claim 35 wherein the call detector which detects receipt of a call of the multi-media transactions by the host further comprises a data analyzing processor which senses the call as being a facsimile transmission and stores a content of the facsimile transmission as a call received under a data format in a database of the host.

43. The apparatus for processing multi-media transactions as in claim 35 wherein the call detector which detects receipt of a call further comprises an internet processor which senses an Internet transmission from a connected telecommunication network and stores a content of the Internet transmission as a call received under a data format in a database of the host.

44. The apparatus for processing multi-media transactions as in claim 35 wherein the service processor which transfers a transaction request from the host to the call processor for assignment of an agent to the call further comprises call request processor which requests an outbound call to a call processing application.

45. The apparatus for processing multi-media transactions as in claim 44 wherein the call request processor which requests an outbound call to a call processing application further comprises a call completion simulation processor which simulates completion of the outbound call to the call processing application.

46. The apparatus for processing multi-media transactions as in claim 45 wherein the simulation completion processor which simulates completion of the outbound call to the call processing application further comprises a call status processor which transfers a call status message to the host including the identity of the assigned agent and requested outbound call.

47. The apparatus for processing multi-media transactions as in claim 46 wherein the call status processor which transfers a call status message to the host further comprises terminal identifier processor which retrieves a terminal identifier of the assigned agent.

48. The apparatus for processing multi-media transactions as in claim 47 wherein the delivery processor which transfers the call received under the data format from the host to the assigned agent further comprises a local area network which transfers a summary of the call from the host to the identified terminal of the assigned agent.

49. The apparatus for processing multi-media transactions as in claim 35 further comprising an activity processor which maintains a queue of calls by the call processor for the multi-media transactions received under voice and data format for the plurality of agents.

50. The apparatus for processing multi-media transactions as in claim 49 wherein the activity processor which maintains a queue of calls further comprises a selection processor which assigns a call of the queued calls to a first available agent of the plurality of agents.

51. The apparatus for processing multi-media transactions as in claim 50 further comprising a queue counter which delays transmission of the identifier of an assigned agent to the host until the transferred transaction request from the host to the call processor reaches a front of the queue.

\* \* \* \* \*